(12) United States Patent
Wickert et al.

(10) Patent No.: US 8,367,198 B2
(45) Date of Patent: Feb. 5, 2013

(54) PRECISELY-SHAPED POROUS PARTICLES

(75) Inventors: Peter D. Wickert, St. Paul, MN (US);
Scott R. Culler, Burnsville, MN (US);
Jerald K. Rasmussen, Woodville, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 193 days.

(21) Appl. No.: 12/808,051

(22) PCT Filed: Nov. 17, 2008

(86) PCT No.: PCT/US2008/083737
§ 371 (c)(1),
(2), (4) Date: Jun. 14, 2010

(87) PCT Pub. No.: WO2009/085424
PCT Pub. Date: Jul. 9, 2009

(65) Prior Publication Data
US 2010/0266847 A1 Oct. 21, 2010

Related U.S. Application Data

(60) Provisional application No. 61/014,825, filed on Dec. 19, 2007.

(51) Int. Cl.
*B32B 5/16* (2006.01)
*B01D 15/08* (2006.01)
(52) U.S. Cl. ......... 428/323; 428/327; 428/331; 210/656
(58) Field of Classification Search ........................ None
See application file for complete search history.

(56) References Cited

U.S. PATENT DOCUMENTS

| | | |
|---|---|---|
| 3,959,251 A | 5/1976 | Porath et al. |
| 4,157,418 A | 6/1979 | Heilmann |
| 4,735,632 A | 4/1988 | Oxman et al. |
| 4,911,903 A | 3/1990 | Unger et al. |
| 5,435,816 A | 7/1995 | Spurgeon et al. |
| 5,468,847 A | 11/1995 | Heilmann et al. |
| 5,500,273 A | 3/1996 | Holmes et al. |
| 5,549,962 A | 8/1996 | Holmes et al. |
| 5,628,952 A | 5/1997 | Holmes et al. |
| 5,690,705 A | 11/1997 | Holmes et al. |
| 5,691,846 A | 11/1997 | Benson, Jr. et al. |
| 5,714,259 A | 2/1998 | Holmes et al. |
| 6,136,251 A | 10/2000 | Etzbach et al. |
| 6,238,449 B1 | 5/2001 | Woo et al. |
| 6,475,253 B2 | 11/2002 | Culler et al. |
| 6,759,080 B2 | 7/2004 | Thunhorst et al. |
| 7,098,253 B2 | 8/2006 | Rasmussen et al. |
| 7,101,621 B2 | 9/2006 | Haddad et al. |
| 2002/0026752 A1* | 3/2002 | Culler et al. .................... 51/298 |
| 2006/0070937 A1 | 4/2006 | Rustamov et al. |
| 2007/0090034 A1 | 4/2007 | Ricker et al. |
| 2007/0251870 A1 | 11/2007 | Henderson et al. |

OTHER PUBLICATIONS

Barrett, Elliott P., et al., "The Determination of Pore Volume and Area Distributions in Porous Substances: Computations from Nitrogen Isotherms," *Journal of the American Chemistry Society* vol. 73 (1951) p. 373-380.
Cameron, Neil R. and Andrea Barbetta, "The Influence of Porogen Type on the Porosity, Surface Area and Morphology of Poly(divinylbenzene) PolyHIPE Foams," *Journal of Materials Chemistry*, vol. 10 (2000) p. 2466-2471.
Champion, Julie A., et al., "Making Polymeric Micro- and Nanoparticles of Complex Shapes," *Proceedings of the National Academy of Sciences*, vol. 104, No. 29 (2007) p. 11901-11904.
Dendukuri, Dhananjay, et al., "Controlled Synthesis of Nonspherical Microparticles Using Microfluidics," *Langmuir* vol. 21 (2005) p. 2113-2116.
Dowding, Peter J., et al., "Production of Porous Suspension Polymer Beads with a Narrow Size Distribution Using a Cross-Flow Membrane and a Continuous Tubular Reactor," *Colloids and Surfaces A: Physicochemical and Engineering Aspects*, vol. 180 (2001) p. 301-309.
Drtina, Gary J., et al., "Highly Cross-Linked Azlactone Functional Supports of Tailorable Polarity," *Macromolecules*, vol. 29 (1996) p. 4486-4489.
Jiang, Peng, et al., "A Lost-Wax Approach to Monodisperse Colloids and Their Crystals," *Science Magazine*, vol. 291 (2001) p. 453-457.
Macintrye, Fiona S. and David C. Sherrington, "Control of Porous Morphology in Suspension Polymerized Poly(divinylbenzene) Resins using Oligomeric Porogens," *Macromolecules*, vol. 37 (2004) p. 7628-7636.
Peterson, Dominic S., et al., "High-Throughput Peptide Mass Mapping using a Microdevice Containing Trypsin Immobilized on a Porous Polymer Monolith Coupled to MALDI TOF and ESI TOF Mass Spectrometers," *Journal of Proteome Research*, vol. 1, (2002) p. 563-568.
Rasmussen, Jerald K., et al., "Crosslinked, Hydrophilic, Azlactone-Functional Polymeric Beads: A Two-Step Approach," *Reactive Polymers*, vol. 16 (1991/1992) p. 199-212.
Rolland, Jason P., et al., "Direct Fabrication and Harvesting of Monodisperse, Shape-Specific Nanobiomaterials," *Journal of the American Chemical Society*, vol. 127, (2005) p. 10096-10100.
Sherrington, David C., "Preparation, Structure and Morphology of Polymer Supports," *Chemical Communications*, (1998) p. 2275-2286.
Xu, Shengqing, et al., "Generation of Monodisperse Particles by Using Microfluidics: Control over Size, Shape, and Composition," *Angewandte Chemie*, vol. 44 (2005) p. 724-728.
Yin, Yadong and Younan Xia, "Self-Assembly of Monodispersed Spherical Colloids into Complex Aggregates with Well-Defined Sizes, Shapes, and Structures," *Advanced Materials*, vol. 13, No. 4, (2001) p. 267-271.
PCT International Search Report, PCT/US2008/083737, dated Jun. 8, 2009.

\* cited by examiner

*Primary Examiner* — Sheeba Ahmed
(74) *Attorney, Agent, or Firm* — Julie A. Lapos-Kuchar

(57) ABSTRACT

Precisely-shaped composites and methods for making these composites are disclosed. The method of this disclosure comprises introducing a precursor composition onto a production tool having at least one continuous surface and a plurality of cavities so as to fill at least a portion of the cavities with the precursor composition and wherein the precursor composition, upon curing, forms a composition having a shape corresponding to the cavities thereby resulting in a plurality of discrete, precisely-shaped particles having a porosity comprising one of the following: (a) 10 m²/g or greater or (b) 5 kdalton or greater. The precisely-shaped particles have at least one essentially flat side. The precisely-shaped particles can be confined in a vessel and used for chromatographic applications.

19 Claims, 4 Drawing Sheets

PRECISELY-SHAPED POROUS PARTICLES

CROSS-REFERENCE TO RELATED APPLICATION

This application is a national stage filing under 35 U.S.C. 371 of PCT/US2008/083737, filed Nov. 17, 2008, which claims priority to U.S. Provisional Application No. 61/014,825, filed Dec. 19, 2007, the disclosure of which is incorporated by reference in its/their entirety herein.

FIELD

This disclosure relates to porous particulate material comprising a curable composition, and a method for making same. When the porous particulate material is confined in a vessel such as in a tube or column, it can be used in chromatographic applications.

BACKGROUND

Suspension polymerization is used to make particles for molding plastics, for removing metal ions from aqueous feedstreams, and is especially used to make particles for chromatographic separation media. Suspension polymerization involves a dispersed monomer droplet phase in a dispersion media, wherein the dispersed monomer has a low solubility in the dispersion media, e.g., a discontinuous aqueous phase (droplet phase) in a continuous organic phase (dispersion media). In suspension polymerization, polymerization occurs in the droplet phase, which can impact particle size. Therefore, small amounts of stabilizer usually are added to stabilize the droplets and hinder coalescence. After polymerization, the particles are collected (e.g., via filtering) and washed.

The particle size in suspension polymerization is controlled by factors including for example, the agitation speed, the fraction of monomer phase, and the type and amount of stabilizer used. Suspension polymerization can result in a large distribution of particle size ranges and typically an additional step is needed to remove the suspended particles from the dispersion media. In addition, a classification step is often required to fractionate the particles into the desired size range. Because of the presence of two discrete, immiscible phases, one is often limited in terms of the components that can be incorporated into the monomer phase. For example, monomers or other additives such as porogens, which would partition into the dispersion media, cannot be effectively used. For these reasons, it is desirable to control the particle size and to have less process steps (i.e., a single phase polymerization).

SUMMARY

In one aspect, the present disclosure provides a plurality of shaped-particles having (i) at least one essentially flat surface and (ii) a porosity comprising at least one of the following: (a) 10 $m^2/g$ or greater or (b) 5 kdalton or greater.

In another aspect, the present disclosure provides a method of making a plurality of precisely-shaped particles by introducing a precursor composition onto a production tool having at least one continuous surface and a plurality of cavities. The precursor composition fills at least a portion of the cavities. Then, the precursor composition, upon curing, forms a solidified composition having a shape corresponding to the cavities thereby resulting in a plurality of precisely-shaped particles. The precisely-shaped particles have a porosity of at least one of the following: (a) 10 $m^2/g$ or greater or (b) 5 kdalton or greater.

In another aspect, the present disclosure provides an article having a vessel and a plurality of particles made by the process having: introducing a precursor composition onto a production tool having at least one continuous surface and a plurality of cavities so as to fill at least a portion of the cavities with the precursor composition and where the precursor composition, upon curing, forms a solidified composition having a shape corresponding to the cavities thereby resulting in a plurality of precisely-shaped particles, where the plurality of particles is confined in the vessel is described.

The above summary is not intended to describe each disclosed embodiment or every implementation of the present disclosure. The detailed description which follows, more particularly exemplifies illustrative embodiments.

DETAILED DESCRIPTION

There is a need to manufacture particles having a precise shape. There is also a need for manufacturing particles using a simple, fast, and economical method. There is also a need to manufacture precisely-shaped particles with various compositions. This disclosure provides precisely-shaped particles and methods for making these particles. Additionally, the process disclosed herein makes it possible to accurately make porous particles having the same dimensions from batch to batch, which can, for example, lead to more consistent chromatography media.

This disclosure relates to precisely-shaped particles and methods for making these precisely-shaped particles. More specifically, a production tool having at least one continuous surface and a plurality of cavities is filled with a precursor composition so as to fill at least a portion of the cavities. Upon curing, the precursor composition forms a solidified composition having a shape corresponding to the shape of the cavities thereby resulting in a plurality of precisely-shaped particles, having a porosity of at least one of the following: (a) 10 $m^2/g$ or greater or (b) 5 kdalton or greater. Additionally, an article comprising confining the precisely-shaped particles in a vessel, such as a tube or column, is described.

As used herein, the expression "precursor composition" means any material that is conformable or can be made to be conformable by heat or pressure or both and that can be rendered non-conformable by means of radiation energy or thermal energy or both. As used herein, the expression "solidified, handleable composition" means a precursor composition that has been polymerized or cured to such a degree that it will not substantially flow or experience a substantial change in shape. The expression "solidified, handleable composition" does not mean that the precursor composition is always fully polymerized or cured, but that the precursor composition is sufficiently polymerized or cured to allow removal thereof from the production tool, even while the production tool continues to move, without leading to substantial change in shape of the composition. After the composition is removed from the production tool, the composition may be exposed to an additional energy source to provide additional cure or polymerization of the composition. As used herein, the term "composition" is synonymous with the expression "solidified, handleable composition".

One embodiment involves a method of making a precisely-shaped particle. In another embodiment, this disclosure involves precisely-shaped particles comprising a solidified, handleable composition. In still another aspect, this disclosure involves a vessel such as a tube or column that contains the precisely-shaped particles.

Figure 1:
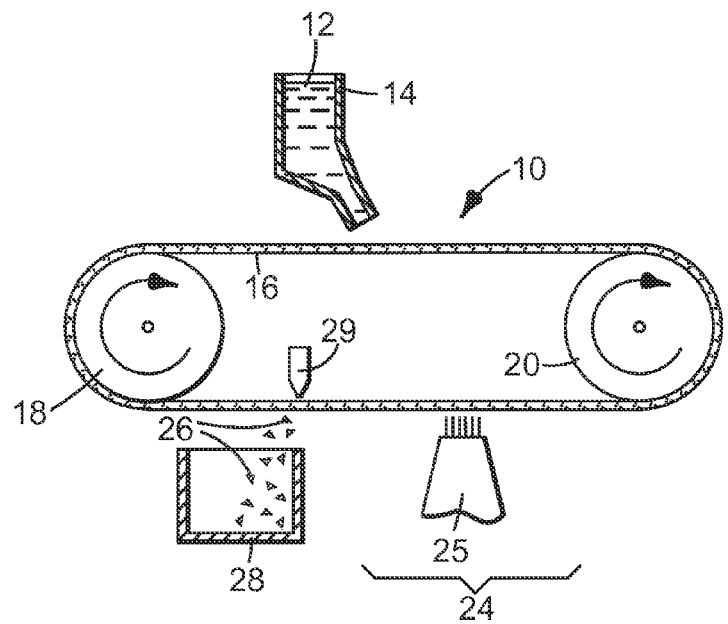
FIGS. 1-3 are side views illustrating various methods of carrying out the process of this disclosure.

FIG. 1 illustrates an apparatus 10 capable of carrying out the method of this disclosure to make the precisely-shaped particles of this disclosure. In apparatus 10, precursor composition 12 is fed by gravity from a hopper 14 onto a production tool 16, which is in the form of an endless belt. Production tool 16 travels over two rolls 18, 20, at least one of which is power driven. FIG. 4 is a perspective view of a segment of production tool 16. The segment illustrated in FIG. 4 is substantially similar to segments of the production tools of FIGS. 1, 2, and 3. As shown in the embodiment depicted in FIG. 4, production tool 16 is a three-dimensional body having a continuous surface 21 containing an opening 22 that provides access to a cavity 23 in the three-dimensional body. Referring again to FIG. 1, precursor composition 12 fills at least a portion of cavity 23. Precursor composition 12 then travels through a curing zone 24 where it is exposed to an energy source 25 to at least partially cure precursor composition 12 to form a solidified, handleable composition. Particles of precisely-shaped material 26 are removed from production tool 16 and collected in a container 28. External means 29 can be used to help release the particles of precisely-shaped material (or precisely-shaped particles) 26 from the production tool 16. Debris left in production tool 16 can be cleaned away before any fresh precursor composition 12 is fed to production tool 16.

Figure 2:
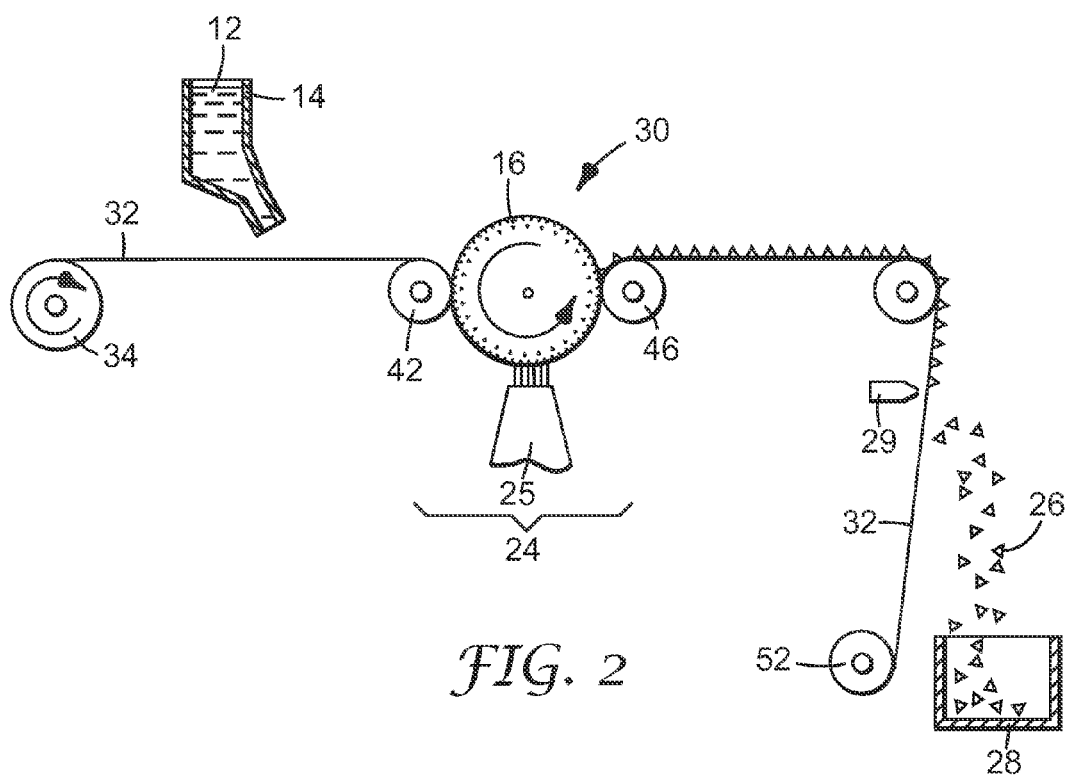

FIG. 2 illustrates another embodiment of an apparatus 30 capable of carrying out the method of this disclosure. Apparatus 30 comprises a carrier web 32, which is fed from an unwind station 34. Unwind station 34 is in the form of a roll. Carrier web 32 can be made of a material such as paper, cloth, polymeric film (e.g., polyester film), nonwoven web, vulcanized fiber, combinations thereof and treated versions thereof. In FIG. 2, carrier web 32 is transparent to radiation. Precursor composition 12 is fed by gravity from hopper 14 onto the surface of carrier web 32. Carrier web 32 containing precursor composition 12 is forced against continuous surface 21 of production tool 16 by means of a nip roll 42. Continuous surface 21 of production tool 16 that contacts carrier web 32 is curved, but is otherwise identical to that of the segment of the production tool shown in FIG. 4. Referring again to FIG. 2, nip roll 42 also aids in forcing precursor composition 12 into cavity 23 of production tool 16. Precursor composition 12 then travels through curing zone 24 where it is exposed to energy source 25 to at least partially cure precursor composition 12 to form a solidified, handleable composition. Next, carrier web 32 containing the solidified, handleable composition is passed over a nip roll 46. There must be sufficient adhesion between carrier web 32 and the solidified, handleable composition in order to allow for subsequent removal of the composition from the cavities of production tool 16. Precisely-shaped material 26 is removed from carrier web 32 and collected in container 28. External means 29 can be used to help release precisely-shaped particles 48 from carrier web 32. Carrier web 32 is then recovered at rewind station 52 so that the carrier web can be reused. Rewind station 52 is in the form of a roll.

Figure 3:
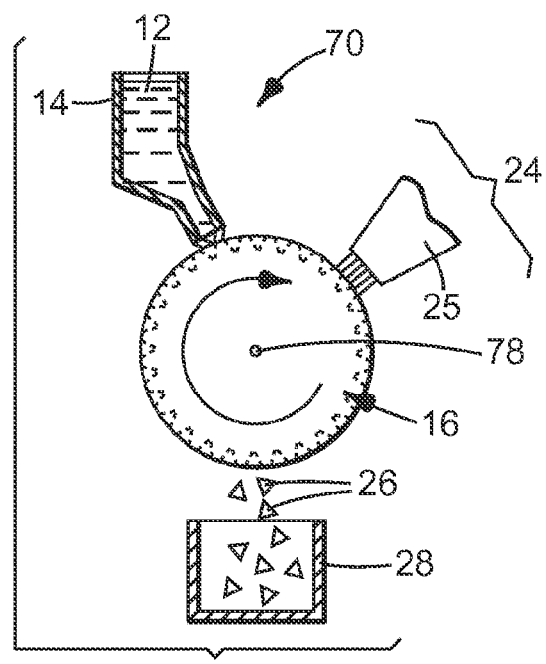
Figure 4:
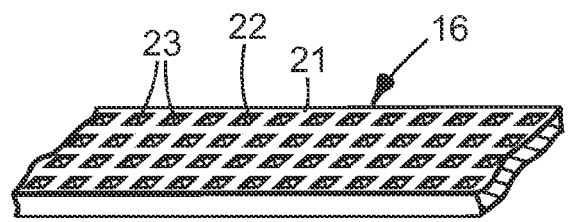
FIG. 4 is a perspective view of a segment of a production tool.

FIG. 3 illustrates another variation of an apparatus capable of carrying out the method of this disclosure. In apparatus 70, precursor composition 12 is knife coated from hopper 14 onto production tool 16. Production tool 16 is in the form of a cylindrical drum and has an axis 78. The continuous surface of production tool 16 is curved, but is otherwise identical to the segment of the production tool shown in FIG. 4. Referring again to FIG. 3, as production tool 16 rotates about the axis 78, precursor composition 12 travels through a curing zone 24 where precursor composition 12 is exposed to energy source 25 to at least partially cure the precursor composition 12 to form a solidified, handleable composition. Next, the particles of precisely-shaped material 26 resulting from the curing step of the process are removed from production tool 16 and collected in container 28. Removal is preferably carried out by mechanical means, e.g., a water jet. It is preferred that any debris remaining in production tool 16 be removed before any fresh precursor composition is introduced. Debris removal can be accomplished by a brush, an air jet, or any other conventional technique. Although not shown in FIG. 3, additional means can be used to aid in removing the particles from the production tool 16.

A master tool may be used to fabricate production tool 16. If a pattern is desired on the surface of the production tool, the master tool should have the inverse of the pattern for the production tool on the surface thereof. The master tool is typically made from metal, such as nickel. The master tool can be fabricated by any conventional technique, such as engraving, hobbing, knurling, electroforming, diamond turning, laser machining, lithography, and other techniques as are known in the art. The preferred method for preparing a metal production tool or master tool is diamond turning.

The preferred materials for production tool 16 are polymers, such as polyolefins (e.g., polypropylene), or metals, such as nickel. The production tool can also be formed from a ceramic material.

A metal production tool can be made by the same methods that can be used to make metal master tools. Also within the scope of this disclosure, is to use a heated production tool, which is preferably made from metal. A heated production tool may allow easier processing, more rapid curing, and easier release of the precisely-shaped particles from the production tool.

In some instances, a polymeric production tool can be replicated from an original master tool. This is especially preferred when the production tool is in the form of a belt or web. One advantage of polymeric production tools over metal production tools is cost. Another advantage of polymeric production tools is the capability of allowing radiation to pass from the radiation source through the production tool and into the precursor composition.

Thermoplastic materials that can be used to construct production tool 16 include: polyesters, polycarbonates, poly (ether sulfone), poly(methyl methacrylate), polyurethanes, polyvinylchloride, polyolefins, polystyrene, or combinations thereof. Thermoplastic materials can include additives such as plasticizers, free radical scavengers or stabilizers, thermal stabilizers, antioxidants, and ultraviolet radiation absorbers. Thermoplastic materials are substantially transparent to ultraviolet and visible radiation. Note that if the production tool is made from a thermoplastic material, the conditions of the method to make the precisely-shaped particles should be set such that any heat generated in the curing zone does not adversely affect the production tool.

A polymeric production tool can be prepared by coating a molten thermoplastic material, such as polypropylene, onto the master tool. The molten material can then be quenched to give a thermoplastic replica of the master tool. This polymeric replica can then be utilized as the production tool. A thermoplastic production tool also can be made by embossing the thermoplastic material with the master tool to form the pattern. Embossing can be conducted while the thermoplastic material is in a flowable state. After being embossed, the thermoplastic material can be cooled to bring about solidification.

Thermosetting materials cured by temperature can be used to construct production tool 16. For example, an uncured thermosetting material is applied to a master tool of the type described previously. While the uncured thermosetting material is on the surface of the master tool, the thermosetting material can be cured or polymerized by heating such that the thermosetting material will set to have the inverse shape of the pattern of the surface of the mater tool. Then, the cured thermosetting material is removed from the surface of the master tool. The production tool can be made of a cured radiation curable material, such as, for example acrylated urethane oligomers. Radiation cured production tools made of thermosetting material are cured by means of exposure to radiation e.g. ultraviolet radiation.

Elastomeric materials can also be used to construct production tool 16. For example, master tool made of nickel and having a flat back surface and a front surface having the inverse of the desired surface topography of the production tool can be placed on a level surface with the front surface facing up. A dike surrounding the front surface of the master tool can be formed by laying appropriate lengths of ¼-inch (about 6.4 millimeter) square steel stock around the edges of the master tool. The dike can be bonded to the master tool with a bead of vinyl polysiloxane impression material available under the trade designation "3M ESPE EXPRESS" (3M Co., St. Paul, Minn.). An elastomer (available under the trade designation "SYLGARD #184", Dow Corning Corp., Midland, Mich.), catalyzed according to the manufacturer's recommendations, can be poured into the front surface of the master tool in sufficient quantity to give a layer having a depth of ¹⁄₁₆-inch (about 1.5 millimeter) to ⅛-inch (about 3 millimeter). The assembly can be allowed to stand at room temperature for eight hours to allow air bubbles to dissipate and a gel to form. The assembly then can be heated in an oven at a temperature of 49° C. for 24 hours to fix the dimensions of the elastomer. A cure of four hour duration at a temperature of 204° C. can be provided. After cooling, the elastomeric production tool then can be separated from the master tool and the edges of the elastomeric production tool trimmed.

The surface of the production tool may contain a release coating, as is known in the art, to permit easier removal of the composition from the cavities and to minimize wear of production tool 16. Typical release agents include silicone-based materials and fluorochemical-based materials. It is within the scope of this disclosure to prepare production tools from polymers that exhibit good release characteristics.

Production tool 16 is a three-dimensional body having at least one continuous surface. Continuous surface 21 contains at least one opening, preferably a plurality of openings, formed in the continuous surface. Each opening provides access to cavity 23 formed in the three-dimensional body. As used in this context, the term "continuous" means characterized by uninterrupted extension in space; the openings and cavities are features in the continuous surface, but they do not break the surface into a plurality of individual surfaces. The production tool can be in the form of a web, a belt, e.g., an endless belt, a sheet, a coating roll, or a sleeve mounted on a coating roll. The production tool can be used in either batch processing or continuous processing. In continuous operations, for example, an endless belt or a cylindrical coating roll rotates about an axis. Typically, a cylindrical coating roll is in the form of a right cylinder, has a diameter of from about 25 cm to about 45 cm, and is constructed of a rigid material. Apparatus utilizing a two-ended web can also be adapted to provide continuous operations.

At least one continuous surface of the production tool contains at least one cavity 23, preferably a plurality of cavities. The solidified, handleable composition will acquire a shape corresponding to the shape of the cavity. Cavity 23 can have any geometric shape. It is also within the scope of this disclosure that a given production tool may contain a variety of cavities of different shapes, different sizes, and combinations thereof. The cavity may not extend completely through the production tool. The cavities may abut or have land areas between them. It is preferred that the sides of the cavities have a slope associated them to allow easier removal of the particle from the production tool.

One surface of the cavity should be open to allow fill of the cavity. Accordingly, this one open surface to fill the cavity may result in the precisely-shaped particle having at least one side that is essentially flat. Essentially flat means that the precursor composition was flat (i.e., having no horizontal slope other than that which may be induced by surface tension) before curing or polymerization. However, curing and/or polymerization and/or shrinkage (e.g., shrinkage stresses) may cause precisely-shaped particle 26 to have a slope or curvature or tilt. Additionally, the volume and/or flatness of the precisely-shaped particle may change due to storage in a delivery media.

Precursor composition 12 is held within cavity 23 and conforms to the shape of the cavity to generate the precisely-shaped particle. Precursor compositions suitable for this disclosure comprise a material that is capable of being "cured" by radiation energy or thermal energy. The precursor compositions can be rendered non-conformable by a simple gellation or phase separation phenomenon, or can polymerize via a condensation curing mechanism or an addition mechanism. The precursor compositions may polymerize via an addition mechanism. Precursor compositions can polymerize via a free radical mechanism or a cationic mechanism or both mechanisms.

Precursor composition 12 can be derived from organic or inorganic material. Representative examples of organic precursor compositions can include: polysaccharides, ethylenically unsaturated compounds, aminoplast derivatives, phenolic resins, epoxy resins, and combinations thereof; preferably, polysaccharides and ethylenically unsaturated compounds and combinations thereof.

Polysaccharides include, for example, agarose and cellulose, and derivatives thereof. Agarose is a hydrogel consisting of polysaccharide chains intertwined into multiple secondary and tertiary structures held together by strong hydrogen bonds. Agarose is commercially available from a variety of suppliers.

Ethylenically unsaturated compounds include free radically polymerizable monomers such as vinyl aromatic compounds (e.g., styrene, divinylbenzene, vinyl pyridine, and the like) and (meth)acrylate derivatives. (Meth)acrylate derivatives can be monomers such as acrylic acid or methacrylic acid, derivatives of acrylic acid or methacrylic acid, or combinations thereof. Suitable derivatives include esters, salts, amides, nitriles, and the like that can be unsubstituted or substituted. Vinyl aromatic monomers and (meth)acrylate derivatives are well known in the art, and are commercially available from a variety of suppliers.

Representative examples of inorganic precursor compositions can include: a metal oxide sol and/or metalloid oxide sol. Example sols include those derived from zirconium, titanium, chromium, aluminum, cerium, tin, Boehmite, silicon, other inorganic sols known in the art, and combinations thereof. Preferably, silicate, silica sol and zirconium sol, and combinations thereof In one embodiment, a functional monomer is added to precursor composition 12 to give the precisely-shaped particle different functionality. Functional monomers can include, for example, charged monomers such as anions or cations, and reactive monomers, such as monomers containing hydroxyl groups, azlactone groups, and epoxy groups. The functional monomer can be added either directly to the precursor composition or added after curing to the precisely-shaped particle.

Some exemplary ionic monomers having a negative charge include: (meth)acrylamidosulfonic acids of Formula I or salts thereof.

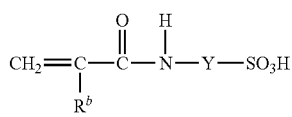

I

In Formula I, Y is a straight or branched alkylene having 1 to 10 carbon atoms and $R^b$ is hydrogen or methyl. Exemplary ionic monomers according to Formula I include, but are not limited to N-acrylamidomethanesulfonic acid, 2-acrylamidoethanesulfonic acid, 2-acrylamido-2-methylpropanesulfonic acid, and 2-methacrylamido-2-methylpropanesulfonic acid.

Salts of acidic monomers can also be used. Suitable ionic monomers also include: sulfonic acids such as vinylsulfonic acid and 4-styrenesulfonic acid; (meth)acrylamidophosphonic acids such as (meth)acrylamidoalkylphosphonic acids (e.g., 2-acrylamidoethylphosphonic acid and 3-methacrylamidopropylphosphonic acid); acrylic acid and methacrylic acid; and carboxyalkyl(meth)acrylates such as 2-carboxyethylacrylate, 2-carboxyethylmethacrylate, 3-carboxypropylacrylate, and 3-carboxypropylmethacrylate. Still other suitable acidic monomers include (meth)acryloylamino acids, such as those described in U.S. Pat. No. 4,157,418 (Heilmann). Exemplary (meth)acryloylamino acids include, but are not limited to, N-acryloylglycine, N-acryloylaspartic acid, N-acryloyl-β-alanine, and 2-acrylamidoglycolic acid. Salts of any of these acidic monomers can also be used.

Some exemplary ionic monomers having a positive charge have an ethylenically unsaturated group as well as an amino group or a salt thereof. These monomers include: amino (meth)acrylates and amino(meth)acrylamides. The amino group can be a primary amino group, secondary amino group, tertiary amino group, or quaternary ammonium group. Typical examples include: N,N-dimethylaminoethyl(meth)acrylate, N,N-diethylaminoethyl(meth)acrylate, N,N-dimethylaminopropyl(meth)acrylate, N-tert-butylaminopropyl (meth)acrylate, N-(3-aminopropyl)(meth)acrylamide, N-[3-(dimethylamino)propyl](meth)acrylamide, (meth) acrylamidopropyltrimethylammonium chloride, 2-(meth) acryloxyethyltrimethylammonium chloride, and 2-(meth) acryloxyethyltrimethylammonium methyl sulfate.

The precursor composition can be introduced to the cavity of the production tool by a dispensing means such as hopper 14. The dispensing means may utilize any conventional technique, such as, for example, gravity feeding, pumping, die coating, or vacuum drop die coating. The precursor composition can also be introduced to the cavities of the production tool by transfer via a carrier web, such as carrier web 32. The precursor composition can be subjected to ultrasonic energy during the mixing step or immediately prior to the coating step in order to lower the viscosity of the precursor composition.

Although precursor composition 12 is only required to fill a portion of the cavity, the precursor composition preferably completely fills cavity 23 of the production tool, so that the resulting precisely-shaped particles will contain few voids or imperfections. Although imperfections may not cause problems for certain applications, these imperfections cause the shape of the precisely-shaped particle to depart from the desired precise shape.

In some embodiments, the precursor composition 12 may be heated prior to being introduced to production tool 16, typically at a temperature in the range from about 40° C. to 90° C. When the precursor composition is heated, its viscosity is reduced with the result that it can flow more readily into the cavities of the production tool. With polysaccharides such as agarose, heating an aqueous mixture results in disruption of the secondary and tertiary structure, allowing the agarose gel to dissolve. After introduction of the heated precursor composition to the production tool, the aqueous mixture cools down, allowing the secondary and tertiary agarose structures to reform to produce solidified, handleable compositions of agarose within the cavities of the production tool.

Following the introduction of precursor composition 12 into cavity 23 of the production tool, the precursor composition may be at least partially cured by exposure to radiation energy or thermal energy while present in the cavities of the production tool. Alternatively, the precursor composition can be at least partially cured while present in the cavities of the production tool, and then post-cured after being removed from the cavities of the production tool. The post-cure step can be omitted. The degree of cure is sufficient that the resulting solidified, handleable composition will retain its shape upon removal from the production tool.

Conditions for thermal cure can involve lowering the temperature, as in the case with gellation of agarose, or can involve raising the temperature, as in the case of a polymerization curing reaction. In this latter case, the conditions can range from a temperature of about 50° C. to about 200° C. and for a time of from fractions of a second to thousands of minutes. The actual amount of heat required is greatly dependent on the chemistry of the precursor composition.

Examples of energy source 25 for use in curing zone 24 include: thermal energy sources such as steam, hot water, hot oil, inductive heating, resistive heating, infrared radiation, microwave radiation, curing ovens, and the like; and radiation energy sources such as electron beam, ultraviolet light, visible light, and laser light.

Electron beam radiation, which is also known as ionizing radiation, can be used at an energy level of about 0.1 to about 20 Mrad, preferably at an energy level of about 1 to about 10 Mrad. Ultraviolet radiation refers to non-particulate radiation having a wavelength within the range of about 200 to about 400 nm, or within the range of about 250 to about 400 nm. The dosage of radiation can range from about 50 mJ/cm$^2$ to about 1000 mJ/cm$^2$, preferably from about 100 mJ/cm$^2$ to about 400 mJ/cm$^2$. Examples of lamp sources that are suitable for providing this amount of dosage provide about 100 to about 600 watts/inch, preferably from about 300 to about 600 watts/inch. Visible radiation refers to non-particulate radiation having a wavelength within the range of about 400 to about 800 nm, or in the range of about 400 to about 550 nm. The amount of radiation energy needed to sufficiently cure the precursor composition depends upon factors such as the depth of the precursor composition while in the cavity, and the chemical identity of the precursor composition.

If ultraviolet or visible light is utilized, a photoinitiator is preferably included in precursor composition 12. Upon being exposed to ultraviolet or visible light, the photoinitiator generates a free radical source or a cationic source. This free radical source or cationic source then initiates the polymerization of the precursor composition. A photoinitiator is optional when a source of gamma radiation or electron beam energy is utilized.

Examples of photoinitiators that generate a free radical source when exposed to ultraviolet light include, but are not limited to, those selected from the group consisting of organic peroxides, azo compounds, quinones, benzophenones, nitroso compounds, acyl halide, hydrozones, mercapto compounds, pyrylium compounds, triacrylimidazoles, bisimidazoles, chloroalkytriazines, benzoin ethers, benzil ketals, thioxanthones, and acetophenone derivatives, and mixtures thereof.

After being at least partially cured, the resulting solidified, handleable composition will preferably not strongly adhere to the production tool. In either case, at this point, the solidified precursor composition is removed from the production tool.

External means 29 may be used to remove the solidified, handleable composition from the production tool. There are several alternative methods for removing the solidified, handleable composition i.e., the composition. Techniques include, but are not limited to, ultrasonic energy, mechanical force, water jet, air jet, or combinations thereof, or other mechanical means. In one method, the composition is transferred directly from the production tool to a collector, e.g., container 28. In this method, if the production tool is made of a polymeric material, the composition can be removed from the cavities by ultrasonic energy, a vacuum, an air knife, or combinations thereof or other conventional mechanical means. If the production tool is made of metal, the composition can be removed from the cavities by means of a water jet or air jet.

In another method, the composition can be transferred indirectly from the production tool to a collector. In one embodiment, the composition can be transferred from the production tool to a smooth roll. The composition exhibits greater adhesion to the smooth roll than to the production tool. The transferred composition can then be removed from the smooth roll by means of skiving, vacuum, water jet, air jet, or other mechanical means. In one particular embodiment, the composition can be transferred from the production tool to a carrier web. The composition exhibits greater adhesion to the surface of the carrier web than to the production tool. The surface of the carrier web to which the composition is transferred can bear a layer of material that is soluble in water or an organic solvent. The composition can easily be removed from the carrier web by merely dissolving the material that forms the soluble layer. In addition, mechanical means, e.g., skiving, vacuum, or ultrasound, can be used to remove the composition. Ultrasonic energy can be applied directly over a major surface of the web or off to a side of a major surface of the web.

After the composition is removed from the production tool, either by direct or indirect means, it is then converted into discrete particles. In one mode of conversion, the composition is released from the production tool in the form of particles. A given particle will have a shape that is essentially the shape of the portion of the cavity of the production tool in which the particle was at least partially cured (i.e., precisely-shaped). An advantage of this mode is that the particles are already of the proper particle size distribution for subsequent use, e.g., chromatography media. In the conventional manner of making chromatography media, the particles have to be screened to obtain proper particle size distribution. In one embodiment, the particles of the present disclosure may be screened to remove particles with fractured edges or land deposits.

In a second mode of conversion, the composition is released from the production tool as a sheet of material comprising precisely-shaped composition material interconnected by a thin layer of composition material. The sheet of material then may be broken or crushed along the thin interconnecting portions to form the discrete (i.e., individual) precisely-shaped particles.

Production tool 16 can be a drum or a belt that rotates about an axis. When the production tool rotates about an axis, the process can be conducted continuously. Alternately, production tool 16 can be stationary and the process is conducted batch-wise. The continuous process of this disclosure should be more efficient and economical than the batch-wise process.

The need and/or desirability for a post-cure step will depend upon the chemical nature of the precursor composition and on the conditions used for cure in the cavities of the production tool. For example, when the precursor composition comprises ethylenically unsaturated compounds, all of the monomer may not become free radically polymerized during the residence time in the production tool. Thus, it may be desirable to apply additional thermal or radiation energy to the particles subsequent to removal from the production tool, in order to convert the remaining monomer to polymer. This additional energy may be applied directly to the particles of solidified, handleable composition themselves, or the particles solidified, handleable composition may be dispersed as a slurry in an inert liquid prior to the application of the energy. When the precursor composition is derived from an organic material such as polysaccharide (e.g., agarose), post-curing may be necessary to enhance structural stability and to prevent redissolution at temperatures above 40° C. This post-curing is most readily accomplished by chemical crosslinking with epichlorohydrin or divinyl sulfone by techniques well known in the literature. With inorganic materials, post-curing may include drying and firing at temperatures up to about 1650° C. or more to impart final size and strength to the formed precisely-shaped particles.

It is preferred that the precisely-shaped particles have no dimension greater than about 2000 μm (micrometers). It is preferred that the precisely-shaped particles have a dimension in the longest direction from 1 μm to 500 μm, from 30 μm to 500 μm, 1 μm to 100 μm, or even 30 μm to 100 μm. As indicated previously, the precise shape corresponds to portions of the surface of the production tool, e.g., cavities formed in the surface of the production tool. The particles of this disclosure have a precise shape. This precise shape is attributable to the precursor composition being at least partially cured in the cavities of the production tool. There may, however, be minor imperfections in the particles that are introduced when the particles are removed from the cavities. If the precursor composition is not sufficiently cured in the cavities, the precursor composition will flow, and the resulting shape will not correspond to the shape of the cavities. This lack of correspondence gives an imprecise and irregular shape to the particle. The precise shape can be any geometrical shape, such as a pyramid (preferably with bases having three or four sides), prism, hemisphere, cylinder, cone, or thin body having opposed polygonal faces separated by a constant or varying distance, i.e., a polygonal platelet. The geometric shapes can be truncated versions of the foregoing and include spheres or ellipsoids or combinations of any of the foregoing (e.g., hemisphere-cylinder).

Precisely-shaped particles 26 may be substantially uniform in size. Substantially uniform in size means that at the 95% confidence interval, the precisely-shaped particles have a characteristic dimension (i.e., same geometric dimension on each particle) within 35%, 30%, 25%, 20%, 15%, 10%, or even 5% of the mean. The precisely-shaped particles may be uniform in shape (i.e., having the same shape). Alternatively, the precisely-shaped particles may be substantially uniform in size and shape. In some embodiments, the plurality of precisely-shaped particles comprise a distribution of two or more shapes. In some embodiments, the plurality of precisely-shaped particles comprises a distribution of two or more substantially uniform sizes. Precisely-shaped particles' size and/or shape can be determined using particle size analyzers, such as using light scatter or reflectance; visually such as using a microscope; or any technique that will measure size or volume of particles as is known in the art. However, if not accounted for, non-spherical precisely-shaped particles may give incorrect uniformity data, depending on what portion of the precisely-shaped particle is presented to the analyzer (e.g., base of a pyramid versus the apex of the pyramid).

When the precisely-shaped particle is removed from the production tool, an edge may break off, thereby creating an imperfection and detracting from the preciseness of the shape. It is preferred that care be taken throughout the process to minimize such imperfections. It is also preferred that the precursor composition not extend substantially beyond the plane of the continuous surface of the production tool and not extend substantially beyond the openings of the cavities of the production tool.

It is preferred that precisely-shaped particles 26 are porous. Porosity is important for many applications, such as ion exchange or protein purification. The porous precisely-shaped particles can be in the form of a macroporous polymeric material or a gel-type polymeric material. As used herein, the term "macroporous" refers to polymeric resins that have a permanent porous structure even in the dry state. Although the polymeric resins can swell when contacted with a solvent, swelling is not needed to allow access to the interior of the polymeric resin through the porous structure. As used herein, the terms "gel-type" or "gel" are used interchangeably to refer to polymeric resins that do not have a permanent porous structure in the dry state, but that can be swollen by a suitable solvent to allow diffusional access to the interior of the polymeric resins. Both macroporous and gel-type polymeric materials are further described in Sherrington, *Chem. Commun.*, 2275-2286 (1998) and Macintyre et al., *Macromolecules*, 37, 7628-7636 (2004). The terms "macroporous" and "gel-type" are not meant to indicate a particular pore size or range of pore sizes.

Pore formation or porosity in polymeric materials is described in detail by Sherrington, *Chem. Commun.*, 2275-2286 (1998). With some materials, especially gel-type materials, porosity is formed during the polymerization or curing process as a result of the entanglement and/or crosslinking of the polymer chains. Typically this porosity is very low or nonexistent unless the polymer network is highly swollen by a solvent. Alternately, porogens can be added to the composition to create permanent pores. Added porogens typically influence the timing of phase separation of the forming polymer network from the rest of the monomer phase mixture. Examples of porogens include: water, common organic solvents (e.g., toluene, cyclohexane, acetonitrile, ethyl acetate), alcohols (e.g., methanol, isopropanol, cyclohexanol, 4-methyl-2-pentanol, decyl alcohol), ethylene glycol, propylene glycol, polyols having at least three hydroxy groups (such as, for example, glycerol, inositol, glucose, sucrose, maltose, dextran, pentaerithritol, trimethylolethane, timethylolpropane, dipentaerithritol, and tripentaerithritol), and polymeric porogens (such as, for example, polystyrene, polyethyleneglycol, polypropyleneglycol, polydimethylsiloxane, polyacrylicacid, and the like), and combinations thereof.

In one embodiment, the precursor composition may comprise a crosslinking monomer, which may control pore size. Crosslinking monomers are monomers with two or more ethylenically unsaturated groups and can include, for example, divinylbenzene, alkylenebis(meth)acrylamides such as methylenebisacrylamide, 1,2-ethylenebisacrylamide and 1,6-hexylenebisacrylamide, alkylenebis(meth)acrylates such as ethyleneglycoldiacrylate and dimethacrylate, hexanediol diacrylate and dimethacrylate, trimethylolpropanetriacrylate and trimethacrylate, and the like.

Porosity in the case of macroporous materials (such as silica or macroporous polymeric materials) can be determined using the nitrogen adsorption method and application of BET theory. This method is commonly used to determine surface area and involves adsorbing a monolayer of nitrogen on the surface of the precisely-shaped particle under cryogenic conditions. The amount of adsorbed nitrogen is proportional to the surface area. If desired, information related to pore size can be obtained by allowing continued adsorption of nitrogen under cryogenic conditions, until the entire pore structure is filled with liquid nitrogen, and applying BJH theory (or other theory) to calculate average pore diameter. This method will generally measure pores having an average diameter up to about 2000 Angstroms. For materials having larger pore sizes, mercury intrusion porosimetry may be utilized to measure average pore diameters.

A macroporous precisely-shaped particle may have a porosity of $10 \text{ m}^2/\text{g}$ or greater, $25 \text{ m}^2/\text{g}$ or greater, $50 \text{ m}^2/\text{g}$ or greater, $100 \text{ m}^2/\text{g}$ or greater, $200 \text{ m}^2/\text{g}$ or greater, $500 \text{ m}^2/\text{g}$ or greater, or even $1000 \text{ m}^2/\text{g}$ or greater.

Porosity in the case of gel-type materials cannot be determined using techniques such as nitrogen adsorption or mercury intrusion, since they possess no porosity in the dry state. Porosity in gel-type materials is inversely proportional to the concentration of material used (e.g., amount of agarose). The porosity can be measured as a function of the molecular size of a polymer that will be just barely excluded from the gel pores. Porosity instead can be inferred in the solvent-swollen state. Depending on the analyte of interest, the porosity can be expressed in kdaltons (proteins and polysaccharides) or base pairs (nucleic acids). The size and shape of the analyte of interest along with other factors including the materials composition, pH, and ionic strength will impact the porosity.

A gel-type precisely-shaped particle may have a porosity of 5 kdalton or greater, 10 kdalton or greater, 50 kdalton or greater, 100 kdalton or greater, 500 kdalton or greater, 1000 kdaltons or greater, or even 10,000 kdaltons or greater. The porosity of the macroporous precisely-shaped particle may be measured as described above for the gel-type materials. Thus, the macroporous precisely-shaped particle may have a porosity of 5 kdalton or greater, 10 kdalton or greater, 50 kdalton or greater, 100 kdalton or greater, 500 kdalton or greater, 1000 kdaltons or greater, or even 10,000 kdaltons or greater.

In one embodiment, precisely-shaped particle 26 has a surface that is unmodified (e.g, bare silica). In another embodiment, the surface of the precisely-shaped particle is modified, for example, by covalently bonding compounds (e.g., silica can be covalently bonded using a silane reaction such as C8 and C18 silanes, precisely-shaped particles prepared from monomers having epoxy or azlactone groups can be reacted with nucleophilic group containing compounds), polymerizing monomers onto the precisely-shaped particle (e.g., zirconia can be modified using polybutadiene), or by coating with a polymeric organic layer (e.g., azlactone-functional copolymer solutions can be formulated with a crosslinking agent and coated as described in U.S. Pat. No. 7,101,621 (Haddad et al.), to provide an activated coating comprising azlactone groups). Other methods of coating particulates with a polymeric organic layer are well known in the art. Surface modification of the precisely-shaped particle can include surfaces comprising: affinity ligands (such as Protein A, lectins, and peptide ligands), antibodies (such as immunoglobulin G (IgG)), hydrophobic ligands such as hydrocarbon chains (such as C18 and C8) and aromatics (such as phenyl and phenethyl), alcohols, amines (such as NH2), cyanos (such as CN), and combinations thereof.

In one embodiment, a plurality of precisely-shaped particles is confined. For example, the precisely-shaped particles can be placed in a vessel (such as a tube), enclosing at least one end of the vessel with a frit to create a chromatographic column. Depending on the precisely-shaped particles' properties (e.g., composition and coating) and the mobile phase used (e.g., solvent, solvent to aqueous ratio, pH, buffer, and additives such as ion-pairing reagents and amine modifiers), these columns may be used for adsorption, partition, ion exchange, size exclusion, and affinity chromatography. In adsorption chromatography, the analyte or target molecule is adsorbed on the surface of the stationary phase. In partition chromatography, a thin film is formed on the surface of the stationary phase and the analyte interacts with the liquid phase on the solid support. In ion exchange chromatography, the analyte ions of opposite charge are attracted to the stationary phase by electrostatic forces. In size exclusion chromatography, the analytes are separated based on size via their interaction with the stationary phase pores. In affinity chromatography, a molecule is immobilized on a stationary phase, for example, an antibody is attached to the stationary phase, to selectively bind the analyte or target molecule of interest, such as a protein.

Suitable columns are known in the art and can be constructed of such materials as glass, polymeric material, stainless steel, titanium and alloys thereof, or nickel and alloys thereof. Methods of filling the column to effectively pack particles in the column are known in the art.

If the precisely-shaped particles are less than about 20 micrometers in size, and/or the shape of the precisely-shaped particles allows little space between adjacent particles, then the back pressure in a chromatographic column filled with the precisely-shaped particles may become unacceptably large, especially for the large columns useful for the purification or separation of large biomolecules. Such limitations would not apply, however, for small scale separations such as encountered in analytical separations using HPLC instrumentation, where small particle diameters, such as 1 to 2 micrometers in diameter, and very high mobile phase pressures are commonly encountered. Although the average particle size in chromatography can be as large as 2000 micrometers, the average particle size is typically no greater than 500 micrometers. If the average particle size is larger than about 500 micrometers, the efficiency of the chromatographic process may be low, especially for the purification or separation of large biomacromolecules such as proteins that often have low diffusion rates into the pores of chromatographic particles The chromatographic column, when packed with precisely-shaped particles 26, can be used to perform ion exchange, size exclusion, affinity, normal, and reverse phase chromatography. The chromatographic columns can be preparatory (e.g., used to separate or purify a desired analyte) and/or can be analytical (e.g., used to quantitate a desired analyte). The chromatographic columns can be part of an instrument such as a liquid chromatograph.

In other embodiments, precisely-shaped particles 26 are disposed on a surface of a filtration medium. If the precisely-shaped particles are treated with a modifying agent to alter the functional group available for reaction or interaction with an analyte or target compound, the modification can be prior to or after disposing on the surface of the filtration medium. The filter element can be positioned within a housing to provide a filter cartridge. Suitable filtration medium and systems that include a filter cartridge are further described, for example, in U.S. Pat. No. 5,468,847 (Heilmann et al). Such a filter cartridge can be used, for example, to purify or separate biomolecules. Typically, less rigid particles or smaller porous particles can be utilized within a filter cartridge compared to within a chromatographic column due to the lower pressure drops inherent in the filter cartridge system.

In other embodiments, the porous precisely-shaped particles are incorporated in a continuous, porous matrix. If the precisely-shaped particles are treated with a modifying agent to alter the functional group available for reaction or interaction with a target compound, the modification can be prior to or after incorporation in the continuous, porous matrix. The continuous, porous matrix is typically a woven or non-woven fibrous web, porous fiber, porous membrane, porous film, hollow fiber, or tube. Useful matrices include woven and nonwoven webs (such as fibrous webs and fibrillated polymeric materials such as fibrillated polytetrafluoroethylene), microporous fibers, and microporous membranes.

Advantages and embodiments of this disclosure are further illustrated by the following examples, but the particular materials and amounts thereof recited in these examples, as well as other conditions and details, should not be construed to unduly limit this disclosure. All materials are commercially available or known to those skilled in the art unless otherwise stated or apparent.

EXAMPLES

The following specific, but non-limiting examples will serve to illustrate the disclosure. All parts, percentages, ratios, etc., in the examples are by weight unless indicated otherwise.

General Procedure for Making the Pyramid-shaped Production Tool

A casting tool made of polypropylene was cast from a copper or nickel master tool. The casting tool surface is patterned with pyramid-shaped features. The casting tool was made of polypropylene and was essentially in the form of a sheet. The pyramids of the pattern had three sides and were disposed such that their bases touched adjacent pyramid bases (close packing). The base of the pyramid is a triangle with sides of about 63 micrometers in length. The height of the pyramid was about 63 micrometers. Next, a surface of polyester film (polyethylene terephthalate; 130 micrometers thick; obtained from 3M Co., St. Paul, Minn.) was pressed against the casting tool by means of a roller. The resulting film surface had cavities formed therein. The cavities can be characterized as inverted pyramids. These inverted pyramids had a base about 63 micrometers in length and a height of the pyramid about 63 micrometers.

General Procedure for Making the Gumdrop-shaped Production Tool

Figure 5:
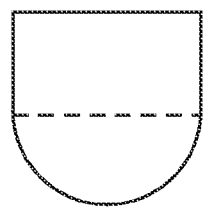
FIG. 5 is a schematic side view illustrating one exemplary particle shape.

A casting tool was made consisting of surface with a pattern of gumdrop-shaped features. The casting tool was made of polyimide and was essentially in the form of a sheet. The inverted gumdrops of the pattern were disposed such that they were close packed in a hexagonal array with a 2-micrometer gap between adjacent structures. The gumdrop-shape consisted of a cylinder section about 69 micrometers in diameter and about 34 micrometers tall with a hemisphere of about 34 micrometer radius superimposed on the cylinder section. This type of pattern is illustrated in FIG. 5. Next, a surface of polyester film (polyethylene terephthalate; 130 micrometers thick) was pressed against the casting tool by means of a roller. The resulting film surface had cavities formed therein, which cavities can be characterized as inverted gumdrops with a height of about 69 micrometers and a base diameter of about 69 micrometers.

Example 1

Figure 6:
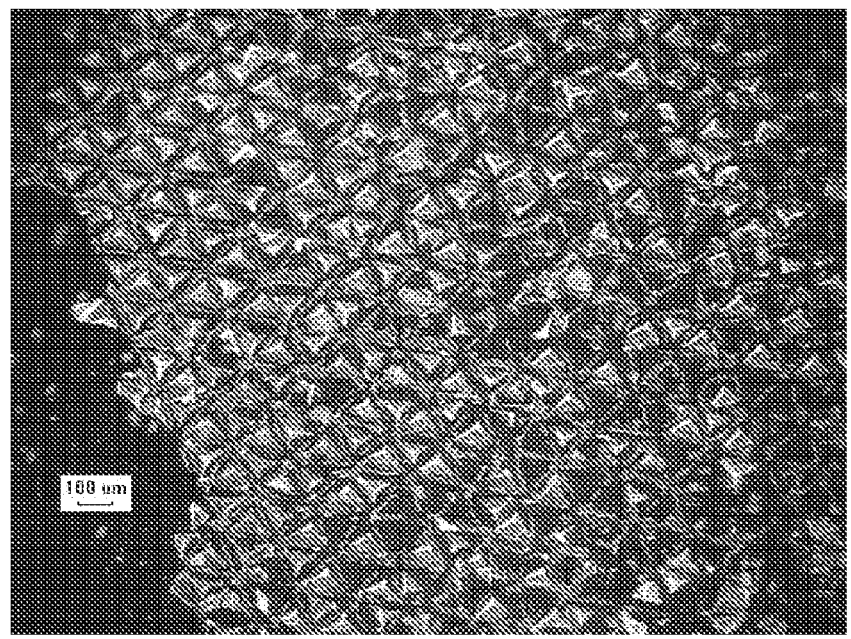
FIGS. 6-8 are photomicrographs of precisely-shaped particles made according to Examples 1, 3, and 7, respectively.

A 2.5 mL aliquot of colloidal silica (obtained under the tradename "NALCO 2329" (40% solids), Nalco, Naperville, Ill.) was mixed with 0.5 mL of 2-propanol (Mallinckrodt Chemicals, Phillipsburg, N.J.). This mixture was applied to the pyramid-shaped production tool and covered with a fluoropolymer release liner (Loparex grade 10256, Loparex, Willowbrook, Ill.). A hand roller was used to distribute the liquid mixture. The liner was removed and the production tool containing the mixture was cured and dried at 60° C. for 30 minutes. A portion of the particles was removed from the production tool with tape and visualized with light microscopy, (64×, Leica Microsystems, Bannockburn, Ill.), where pyramid-shaped particles were observed as shown in FIG. 6.

Example 2

A 5 mL aliquot of 40-42° Bé sodium silicate (EMD Chemicals Inc., Gibbstown, N.J.) was mixed with 20 mL of deionized water and 2.5 mL of 2-propanol (Mallinckrodt Chemicals, Phillipsburg, N.J.). To this mixture 0.5 mL of concentrated hydrochloric acid (J.T. Baker, Phillipsburg, N.J.) was added with mixing. The acidified mixture was immediately applied to the pyramid-shaped production tool, and covered with a fluoropolymer release liner (Loparex grade 10256, Loparex, Willowbrook, Ill.). A hand roller was used to distribute the liquid. When the initial mixture had gelled, the liner was removed and the production tool with precursor composition was allowed to further cure and dry at 60° C. for 1 hour. A portion of the precisely-shaped particles was transferred to tape and viewed under light microscopy, where pyramid-shaped particles were observed.

Example 3

Figure 7:
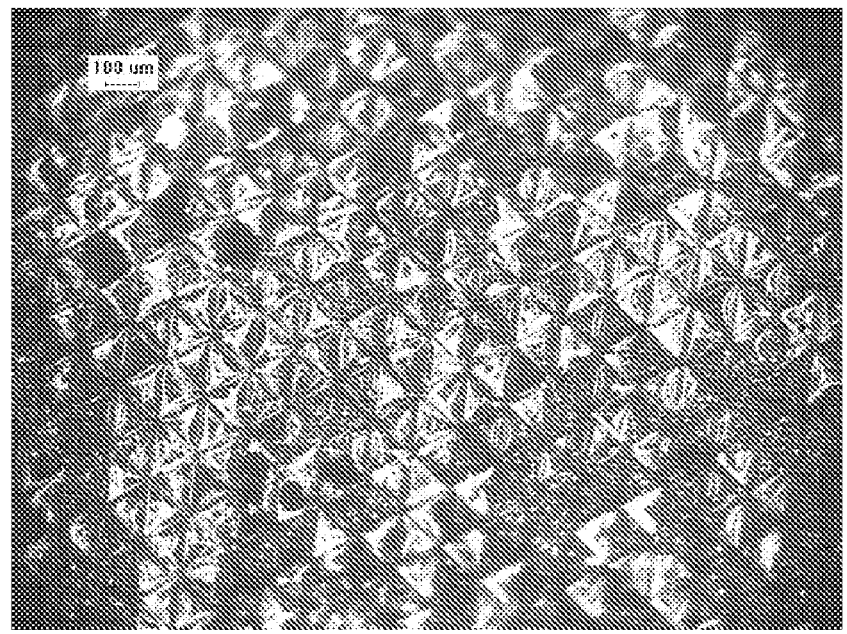

A 2 g aliquot of agarose (catalog number A-9793, Sigma Chemical, St. Louis, Mo.) was added to 100 mL of deionized water in a flask and brought to a boil. To aid subsequent visualization under a microscope, 0.1 g of titanium dioxide (Aldrich, Milwaukee, Wis.) was added. The flask was then cooled in a 47° C. water bath. A portion of the mixture was added to the pyramid-shaped production tool, covered with a fluoropolymer release liner (Loparex grade 10256, Loparex, Willowbrook, Ill.), and the mixture was spread with a hand roller. The agarose gelled in approximately 5 minutes. A portion of the precisely-shaped particles was transferred to tape and viewed under light microscopy, where pyramid-shaped particles were observed as shown in FIG. 7.

Example 4

The following were mixed together: 2.0 g of ethylene glycol dimethacrylate (Aldrich, Milwaukee, Wis.), 1.2 g of 2-hydroxyethyl methacrylate (Aldrich, Milwaukee, Wis.), 6.0 g of decyl alcohol (Aldrich, Milwaukee, Wis.), and 0.1 grams of 2,2'-azobis(2-methylbutyronitrile) (obtained under the trade designation "VAZO 67", Dupont, Belle, W.V.). The mixture was added to the pyramid-shaped production tool and covered with a fluoropolymer release liner (Loparex grade 10256, Loparex, Willowbrook, Ill.). A hand roller was used to spread the mixture. The assembly was sandwiched between two quartz glass plates and exposed to ultraviolet light (model B100 AP obtained under the trade designation "BLAK-RAY", Upland, Calif.) through the liner for 45 minutes. A portion of the precisely-shaped particles was transferred to tape and viewed under light microscopy, where pyramid-shaped particles were observed.

Example 5

The following were mixed together: 1.5 g of divinyl benzene (Aldrich, Milwaukee, Wis.), 1.5 g of styrene (Aldrich Milwaukee, Wis.), 2.4 g of 4-methyl-2-pentanol (Aldrich, Milwaukee, Wis.), and 0.1 g of 2,2'-azobis(2-methylbutyronitrile) (obtained under the trade designation "VAZO 67", DuPont, Belle, W.V.). The mixture was added to the pyramid-shaped production tool and covered with a fluoropolymer release liner (Loparex grade 10256, Loparex, Willowbrook, Ill.). A hand roller was used to spread the liquid on the production tool under the liner. The assembly was sandwiched between two quartz glass plates and monomers were exposed to ultraviolet light through the liner for 2 hours. A portion of the precisely-shaped particles was transferred to tape and viewed under light microscopy, where pyramid-shaped particles were observed.

Example 6

The following were mixed together: 1.54 g of methylene-bis-acrylamide (Research Organics, Cleveland, Ohio), 2.54 g of AMPS solution (1-propanesulfonic acid, 2-methyl-2 (1-oxo-2-propenyl) amino monosodium salt solution 50% in water obtained from Lubrizol, Wickliffe, Ohio), 8.5 mL 2-propanol (Mallinckrodt Baker Inc., Phillipsburg, N.J.), 3.74 mL deionized water, 0.060 g sodium persulfate (Mallinckrodt Baker Inc., Phillipsburg, N.J.), and 60 µL tetramethylethylenediamine (Avocado Organics, Heysham, UK). The mixture was added to the pyramid-shaped production tool and covered with a fluoropolymer release liner (Loparex grade 10256, Loparex, Willowbrook, Ill.). A hand roller was used to spread the liquid on the surface of the tooling under the liner. The assembly was sandwiched between two quartz glass plates. After 1 hour, a portion of the precisely-shaped particles was removed via washing and viewed under light microscopy, where pyramid-shaped particles were observed.

Example 7

Figure 8:
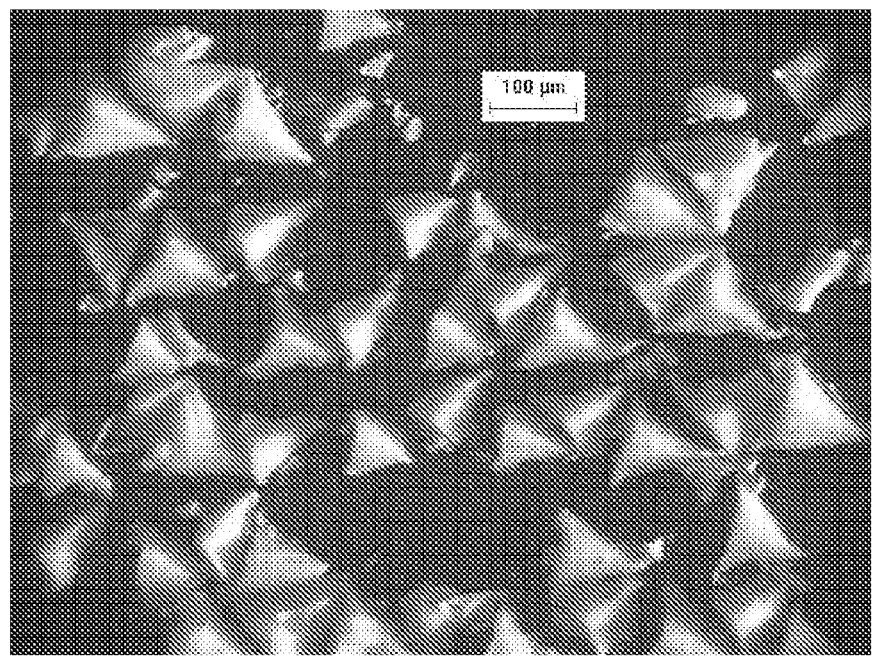

A 5 g aliquot of polyethylene glycol 6,000 (Dow Chemical, Midland, Mich.) was dissolved in 37.4 mL of filtered deionized water. Then, 15.4 g of methylene-bis-acrylamide (Research Organics, Cleveland, Ohio), 85 mL isopropyl alcohol (Mallinckrodt Chemicals, Phillipsburg, N.J.), 20 mL ethylene glycol (J.T. Baker, Phillipsburg, N.J.), and 25.5 g of AMPS solution (50% obtained from Lubrizol, Wickliffe, Ohio) was added to the polyethylene glycol solution and mixed. Then 1 g of 2,2'-azobis-(2-methylpropionamidine)(HCl)$_2$ (Aldrich Chemical, Milwaukee, Wis.) was added and mixed. The mixture was added to the pyramid-shaped production tool and covered with a fluoropolymer release liner (Loparex grade 10256, Loparex, Willowbrook, Ill.). A hand roller was used to spread the liquid on the production tool under the liner. A piece of quartz glass was placed on the top of the liner and underneath the pyramid-shaped production tool, and the assembly was exposed to ultraviolet light for 20 min. A portion of the precisely-shaped particles were viewed under light microscopy, where pyramid-shaped particles were observed as shown in FIG. 8. After thorough washing and drying under vacuum, the porosity of the precisely-shaped particles was determined using nitrogen adsorption (TriStar 3000 Gas Adsorption Analyzer, Micromeritics Instrument Corp., Norcross, Ga.). The single point BET surface area of the precisely-shaped particles was measured as 112.2 m$^2$/g.

Comparative Example 1

A particle was made following the General Procedure 1 listed in U.S. Pat. No. 6,475,253 (Culler et al.) with the following slurry: 32% 60/40 blend of TMTPA/TATHEIC (Satomer, Exton, Pa.), 0.32% photoinitiator (benzil dimethyl ketal available as Esacure KB1, from Satomer, Exton, Pa.), 45.86% grinding aid KBF$_4$ with a particle size of about 125 μm and 21.82% grinding aid KBF$_4$ with a particle size of about 10 μm. The porosity the precisely-shaped particle was determined using nitrogen adsorption (TriStar 3000 Gas Adsorption Analyzer, Micromeritics Instrument Corp., Norcross, Ga.). The single point surface area of the precisely-shaped grinding aid, used in abrasive articles, had a single point BET surface area of 0.5 m$^2$/g.

Example 8

Figure 9:
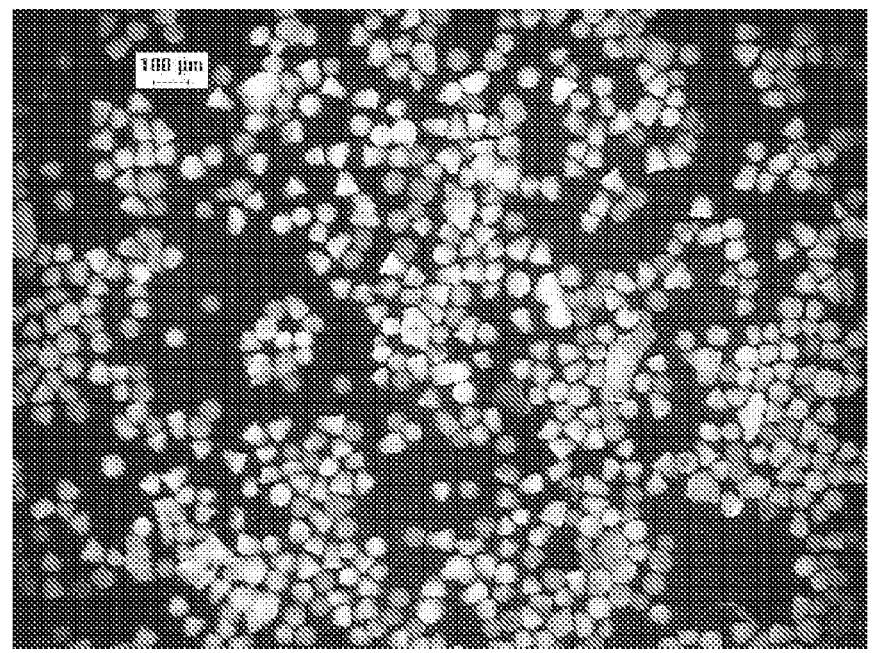
FIG. 9 is a photomicrograph of precisely-shaped particles made according to Example 8.

The acrylamide mixture as prepared in Example 7 was added to the gumdrop-shaped production tool. The mixture was added to the tooling and covered with a fluoropolymer release liner (Loparex grade 10256, Loparex, Willowbrook, Ill.). A hand roller was used to spread the liquid on the production tool under the liner. A piece of quartz glass was placed on the top of the liner and underneath the pyramid-shaped production tool and the assembly was exposed to ultraviolet light for 5 to 20 min. A portion of the precisely-shaped particles were viewed under light microscopy, where gumdrop-shaped particles were observed as shown in FIG. 9.

Example 9

The precisely-shaped particles from Example 8 were washed with water and packed as an aqueous slurry into a 0.3 cm×5 cm glass column made by Bio-Chem Valve, Boontown, N.J. Porous Teflon frits (25 micrometer average pore size, Small Parts, Inc., Miami Lakes, Fla.) were placed at both ends of the tube to form a liquid chromatography column. The column was assembled in an FPLC (fast protein liquid chromatograph) (obtained under the trade designation "AKTA EXPLORER 10", GE Healthcare, Uppsala, Sweden) and equilibrated with a mobile phase of 50 mM acetate, 40 mM NaCl at pH=4.5 at a flow rate of 0.088 mL/min. A solution of 5 mg/ml IgG (Equitech, Kerrville, Tex.), 50 mM acetate, 40 mM NaCl at pH=4.5 was pumped through the column. Using UV detection, the eluent was monitored at a 280 nm wavelength. The 280 nm absorbance was correlated with IgG concentration. The IgG breakthrough from the column was monitored over time. It was determined that the particles could bind 68 mg IgG per mL of media at 10% breakthrough.

Foreseeable modifications and alterations of this invention will become apparent to those skilled in the art without departing from the scope and spirit of this invention. This invention should not be restricted to the embodiments that are set forth in this application for illustrative purposes.

What is claimed is:

1. An article comprising:
a vessel having an inlet and an outlet and a chromatography medium disposed in the vessel, the chromatography medium comprising a plurality of precisely-shaped particles having (i) at least one essentially flat surface and (ii) a porosity comprising at least one of the following: (a) 10 m$^2$/g or greater or (b) 5 kdalton or greater.

2. An article according to claim 1, wherein the porosity is 100 m$^2$/g or greater.

3. An article according to claim 1, wherein the porosity is 50 kdalton or greater.

4. An article according to claim 1, wherein the precisely-shaped particle is derived from a precursor composition, wherein the precursor composition is derived from either an organic material or an inorganic material.

5. An article according to claim 4, wherein the inorganic material comprises at least one of a silicate, a titanium sol, and a silica sol.

6. An article according to claim 4, wherein the organic material comprises an ethylenically unsaturated compound.

7. An article according to claim 4, wherein the precursor composition further comprises a porogen.

8. An article according to claim 7, wherein the porogen comprises at least one of an alcohol, an ethylene glycol, polyethyleneglycol, and a propylene glycol.

9. An article according to claim 1, wherein the precisely-shaped particles comprise a functional group.

10. An article according to claim 9, wherein the functional group is at least one of an affinity ligand, a cation, an anion, and a hydrophobic ligand.

11. An article according to claim 1, wherein the precisely-shaped particles are substantially uniform in size.

12. An article according to claim 1, wherein the precisely-shaped particles are uniform in shape.

13. An article according to claim 11, wherein the precisely-shaped particles are uniform in shape.

14. An article according to claim 1, wherein the plurality of precisely-shaped particles comprise a distribution of two or more shapes.

15. An article according to claim 1, wherein the plurality of precisely-shaped particles comprise a distribution of two or more substantially uniform sizes.

16. An article according to claim 1, wherein the vessel is a tube.

17. An article according to claim 4, wherein the organic material comprises a polysaccharide.

18. An article according to claim 4, wherein the precursor composition is substantially free of a porogen.

19. A method of separating comprising:
providing a chromatography medium comprising a plurality of precisely-shaped particles having (i) at least one essentially flat surface and (ii) a porosity comprising at least one of the following: (a) 10 m$^2$/g or greater or (b) 5 kdalton or greater;
contacting the chromatography medium with a liquid mixture; and
separating the mixture.

* * * * *